July 29, 1952 B. HOOZ ET AL 2,605,117
HAND TRUCK
Filed Sept. 23, 1946 2 SHEETS—SHEET 1

BENJAMIN HOOZ.
SAMUEL T. MELLO.
INVENTORS.

BY Huebner, Maltby
and Deeeler

ATTORNEYS.

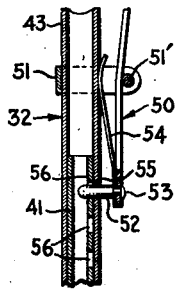
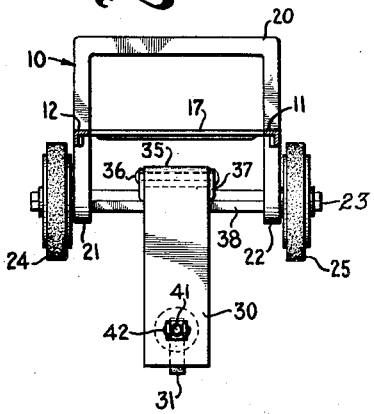
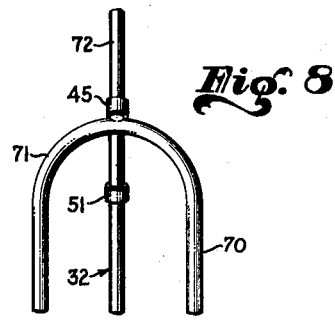
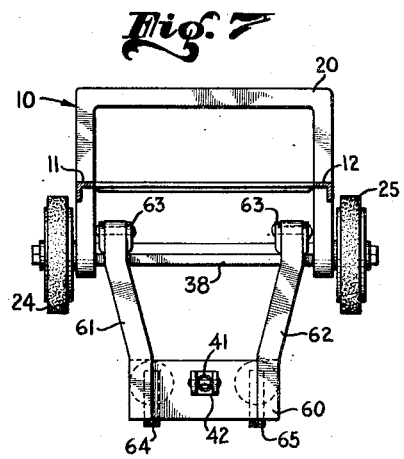
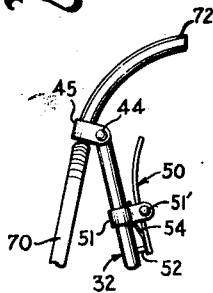

Patented July 29, 1952

2,605,117

UNITED STATES PATENT OFFICE 2,605,117

HAND TRUCK

Benjamin Hooz, Los Angeles, and Samuel T. Mello, Bell Gardens, Calif.; said Mello assignor to said Hooz Application September 23, 1946, Serial No. 698,746

2 Claims. (Cl. 280—54)

The invention relates to hand trucks of the type used to move cartons, barrels, crates and boxes.

For a great many years there has been little or no change in the design of the conventional hand truck used in warehouses, stores and other locations for moving boxes and bags. The fundamental design of the hand truck, including a relatively flat frame or body having rollers at one end, wheels and a toe-piece at the other end and a pair of supporting legs, has been almost universally adhered to.

Although the conventional hand truck has served its purpose with reasonable acceptability, it is made to work under many circumstances solely by reason of sheer strength or dexterity on the part of the operator. When the conventional hand truck is stood on end for loading, a somewhat precarious balance is depended upon to hold it in upright position until it is fully loaded. When the load on the truck is heavy, the operator depends upon the strength of his arms to support that portion of the load not carried by the wheels when the truck is tilted toward him preparatory to moving it about the floor. When the truck is lowered so that the body or frame is parallel to the floor, rigid legs support the end of the truck adjacent the handles, and the truck can no longer be freely moved about.

It is among the objects of the invention to provide a new and improved type of hand truck of a design providing a substantial increase in stability in all positions of the truck and incorporating safety features not heretofore incorporated in the conventional type of hand truck.

Another object of the invention is to provide a new and improved hand truck which is adapted to be rigidly fixed in any one of three or possibly more different positions of operation.

Still another object of the invention is to provide a new and improved hand truck which can with greater safety be retained up-ended for loading purposes, which can be retained in a semi-tilted position with the toe piece lifted off the floor, and which can be lowered to and retained in a horizontal position in which the truck is free to be moved about upon wheeled supports.

Still further among the objects of the invention is to provide a new and improved attachment for hand trucks of more or less conventional design in which the aims outlined in the foregoing objects are realized, the attachment being one which can be quickly applied without substantial alteration of the design of the truck and which incorporates working parts capable of functioning in a cooperative manner entirely independently of the structure of the truck, the attachment being of a type which can be adjusted to fit any one of a wide variety of different styles and sizes of trucks.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 5 is a cross-sectional view taken on the line 5—5 of Figure 1.

Figure 6 is a fragmentary, sectional view of a latch at the rear portion of the device.

Figure 7 is a cross-sectional view similar to Figure 5 but showing a modified form of the device.

Figure 8 is a fragmentary, front, elevational view showing a modified handle structure.

Figure 9 is a side elevational view of the modified structure shown in Figure 8.

Figure 1:
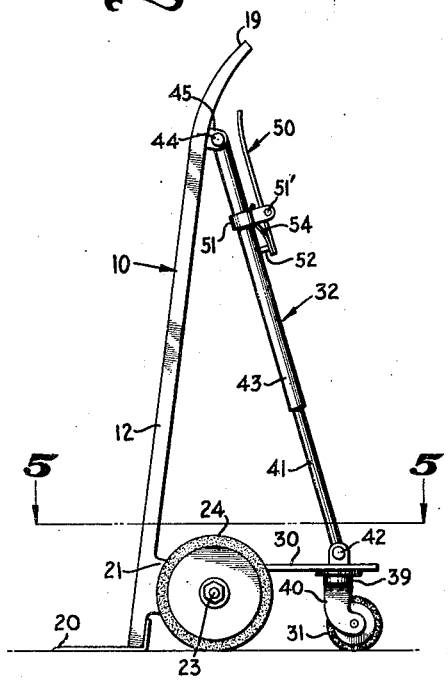
Figure 1 is a side elevational view of one embodiment of the invention in upstanding position.

In the embodiment selected for the purpose of illustrating the invention there is shown a hand truck comprising a body or frame 10 consisting of side elements 11 and 12 secured together by ribbed cross-pieces 13, 14, 15, 16 and 17. Handles 18 and 19 are provided at the upper ends of the side elements. At the lower ends of the side elements there is provided a toe piece 20 of substantially conventional design which, in up-ended position of the truck, lies flat upon the floor as illustrated in Figure 1.

Also at the lower ends of the side elements are shaft mountings or brackets 21 and 22 which provide a bearing support for an axle 23, comprising in the present embodiment extensions of a shaft 38, upon which are mounted wheels or rollers 24 and 25 designed to carry the frame upon a supporting surface 26. In the invention herein described the customary legs usually found on a hand truck are omitted.

Figure 3:
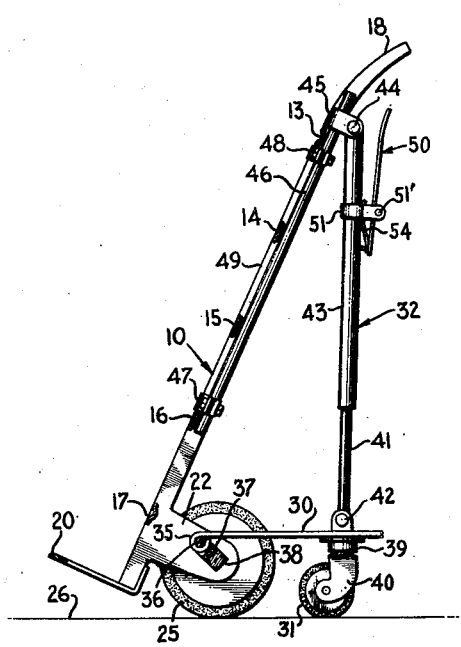
Figure 3 is a longitudinal, sectional view of the device taken on the line 3—3 of Figure 2 showing the truck in tilted position.
Figure 2:
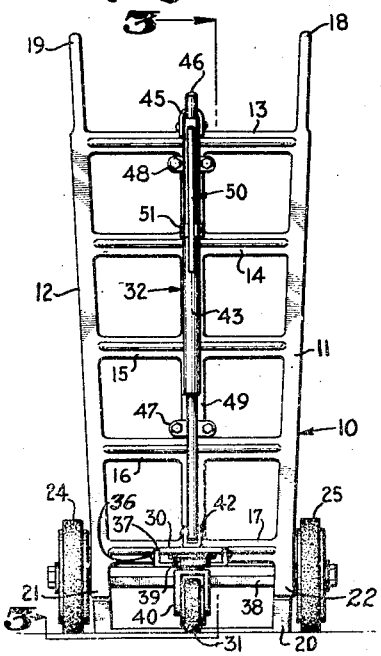
Figure 2 is a rear elevational view of the device shown in Figure 1.
Figure 4:
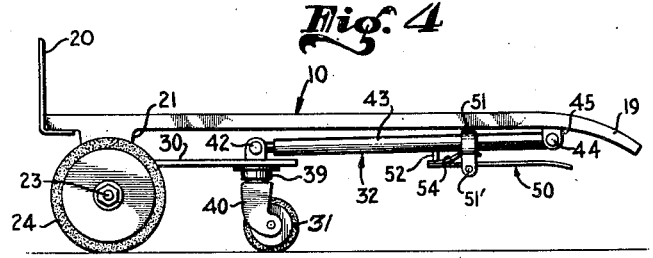
Figure 4 is a side elevational view of the device in lowered position.

For supporting the hand truck in the three positions illustrated in Figures 1, 3 and 4 there is provided an attachment featuring a platform or what may be termed a third wheel or tricycle carriage 30 carried by a caster wheel 31 and incorporating a column 32 which acts in the nature of an extensible brace.

Specifically, the platform 30 is incorporated in a metal strip having its forward end turned into the form of a loop 35 and adapted to pivotally encircle a pin 36 carried by a bracket 37 mounted upon the shaft 38 which extends between the brackets 21 and 22. At the end of the platform remote from the pin the caster wheel 31 mounted in a fork 40 is shown provided with a swivel mounting 39 enabling the wheel to be free to rotate in any direction. The pin 36 may be made removable so that whenever desired the platform may be disconnected from the truck.

The column 32 comprises an interior rod or tube 41 having at its lower end a pivotal attachment 42 to the end of the platform adjacent the caster wheel. A hollow rod 43 has at its upper end a pivotal connection 44 to a clamp 45. The clamp, in turn, is fastened upon an anchoring attachment here shown in the form of a rod 46 which is provided with a means of securing the rod to the body or frame of the hand truck.

In this form of the invention the means of attachment comprises clamps 47 and 48 by means of which the rod 46 may be clamped upon a longitudinal beam 49 extending along the longitudinal center line of the body or frame of the truck. It will be clear that the rod may be moved upwardly or downwardly for the purpose of adjustment and also that the clamp 45 may be shifted with respect to its location on the rod. By this device the same attachment may be fitted to any one of a number of different trucks of different sizes.

For locking the column 32 in one of its several positions of adjustment there is show a latch, illustrated in elevation in Figures 1, 2, 3 and 4 and in section in Figure 6. The latch comprises a clamp 51 and a finger 50 underlying a transverse pin 51' on the clamp 51.

At the lower end of the finger is a locking pin 52 having a rivet connection 53 to the finger, the same connection being adapted to attach one end of a leaf spring 54 to the finger. The leaf spring is adapted to extend to a position between the sides of the clamp 51 beneath the finger and being under spring tension tends to hold the finger and locking pin in the positions shown in Figure 6.

The hollow rod 43 is provided with a single aperture 55 through which the locking pin is adapted to extend into engagement with one of a plurality of apertures 56 in the interior rod 41.

In the form of the invention illustrated in Figure 7 the truck frame comprising the side elements 11 and 12, toe piece 20 and wheels 24 and 25 incorporates a platform or third wheel carriage 60 having two legs 61 and 62, each of which have a pivotal connection 63 to the shaft 38. At the end of the carriage remote from the shaft 38 there are mounted two swivel casters 64 and 65. The pivotal attachment 42 is adapted to carry the column 32 as previously described.

When desired, the attachment may be mounted with considerable ease upon a truck wherein the frame has a structure similar to that shown in Figures 8 and 9. Here the frame consists of a tubular member 70 having a curved cross-piece 71 joining the tubular member at opposite sides of the truck. A single handle rod 72 extends upwardly from the curved portion 71.

When this construction is encountered upon one of the hand trucks to which the attachment is to be made, the bracket 45 may be attached directly to the handle and in this way provide the column 32 with the previously described pivotal connection 44 required for operation of the invention. The latch previously described in detail is used in the same manner in the modified form illustrated in Figures 8 and 9.

In use the truck is normally up-ended in the position shown in Figure 1 for loading. In that position the column 32 is extended to its greatest length and locked in extended relationship by means of the latch. In this position the column 32 firmly braces the location of the caster wheel 31, and the wheel 31 with the wheels 24 and 25 form a three point support for the truck or frame, thereby greatly adding to its stability when lifted to a loading position.

After the loading has been completed, the truck frame may be tilted rearwardly to the position shown in Figure 3 by the exercise of no more than a pull upon the handles. At the same time the pull is made, however, or slightly prior to the exertion of the pull, the latch is moved to open position by pressure of one hand or the other of the operator upon the finger 50.

Opening of the latch lifts the locking pin 52 out of position and permits the column to shorten an amount sufficient to permit the locking pin 52 to slide into the next aperture 55. This is the position shown in Figure 3, and by means of the latch the truck frame is locked in a semi-tilted position, the caster wheel 31 and truck wheels 24 and 25 forming a three point support for the truck and its contents.

If desired, the truck can be wheeled about in semi-tilted position as shown. If operation in a semi-tilted position is found not to be feasible, the latch can again be released and the truck body permitted to fall to the substantially horizontal position shown in Figure 4.

With the column 32 collapsed in the manner shown the caster wheel 31 serves, in effect, as a leg for the truck, supporting it in a horizontal position as shown. By reason of the fact that both portions of the column are collapsed to the full extent of their movement one with respect to the other the frame cannot be lowered unnecessarily close to the supporting surface or, in fact, no closer than the horizontal position shown in Figure 4. In this position the caster wheel or roller 31 serves not only as a leg-like support for the frame but also as a rolling support acting together with wheels or rollers 24 and 25 providing a three point horizontal support for the truck, in which position it can be moved freely about.

From the horizontal position shown in Figure 4 the truck may be lifted in the customary manner by lifting upon the handles 18 and 19 without it being necessary to release the finger 50. As thus handled, the truck plays the part of a conventional hand truck. At any moment, however, the finger 50 may be released permitting the caster wheel 31 to lower by virtue of its own weight into contact with the supporting surface, in which position it may be latched. The truck then may be said to have a three point support in the manner heretofore described.

The attachment herein described is particularly simple in its design and construction and by reason of its compact arrangement is adapted to be applied to many different types of hand trucks, thereby converting the initially conventional hand truck into a novel trucking device of the type described herein. The attachment may be a permanent part of the truck or may be adapted to be attached and removed therefrom at will.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

1. A hand truck comprising, a body having handle means at one end thereof and a pair of ground-engaging wheels at the other end thereof mounted on a common axis, a rearwardly extending carriage pivoted to said body on a fixed axis adjacent and parallel to said common axis, a ground-engaging caster wheel on said carriage spaced a substantial distance rearwardly of said common axis, a brace member comprising telescopically related elements, one of said elements being permanently pivoted to said body and the other of said elements being permanently pivoted to said carriage on axes spaced from and parallel to said common axis, and latch means carried by one of said elements and engageable with said other element at a plurality of positions to lock said elements in telescopically adjusted positions to thereby vary the length of said brace member, the pivotal connection between the brace member and said body comprising a pivot-supporting bracket, a rod fixed to said body generally normal to said common axis, and means for securing said bracket to said rod at selected positions therealong.

2. A hand truck comprising, a body having handle means at one end thereof and a pair of ground-engaging wheels at the other end thereof mounted on a common axis, a rearwardly extending carriage pivoted to said body on a fixed axis adjacent and parallel to said common axis, a ground-engaging caster wheel on said carriage spaced a substantial distance rearwardly of said common axis, a brace member comprising telescopically related elements, one of said elements being permanently pivoted to said body and the other of said elements being permanently pivoted to said carriage on axes spaced from and parallel to said common axis, and latch means carried by one of said elements and engageable with said other element at a plurality of positions to lock said elements in telescopically adjusted positions to thereby vary the length of said brace member, the pivotal connection between said brace and said body comprising a pivot-supporting rod, means releasably securing said rod to said body with said rod extending generally normal to said common axis for longitudinal adjustment to vary the distance between the pivot carried thereby and the said common axis.

BENJAMIN HOOZ.
SAMUEL T. MELLO.

REFERENCES CITED

The following references are of record in the file of this patent:

UNITED STATES PATENTS

| Number | Name | Date |
|---|---|---|
| 525,954 | Kinder | Sept. 11, 1894 |
| 627,284 | Walker | June 20, 1899 |
| 1,358,235 | Nylin | Nov. 9, 1920 |
| 2,030,925 | Lea | Feb. 18, 1936 |